(12) United States Patent
Sheehan et al.

(10) Patent No.: US 8,291,438 B2
(45) Date of Patent: Oct. 16, 2012

(54) PRINTING FOR VIRTUALIZED APPLICATIONS

(75) Inventors: John M Sheehan, Somerville, MA (US); Cread W Mefford, Malden, MA (US); Stuart H Schaefer, Sammamish, WA (US); Jeffrey J Bromberger, Omaha, NE (US)

(73) Assignee: Microsoft Corporation, Redmond, WA (US)

( * ) Notice: Subject to any disclaimer, the term of this patent is extended or adjusted under 35 U.S.C. 154(b) by 1292 days.

(21) Appl. No.: 11/771,610

(22) Filed: Jun. 29, 2007

(65) Prior Publication Data

US 2009/0007151 A1    Jan. 1, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................................... 719/324
(58) Field of Classification Search .................... 719/324
See application file for complete search history.

(56) References Cited

U.S. PATENT DOCUMENTS

| | | | | |
|---|---|---|---|---|
| 6,256,750 | B1 * | 7/2001 | Takeda | 714/11 |
| 6,943,905 | B2 * | 9/2005 | Ferlitsch | 358/1.13 |
| 7,143,210 | B2 * | 11/2006 | Ferlitsch | 710/38 |
| 2006/0036570 | A1 | 2/2006 | Schaefer et al. | |
| 2007/0300221 | A1 * | 12/2007 | Hartz et al. | 718/1 |

* cited by examiner

*Primary Examiner* — Emerson Puente
*Assistant Examiner* — Kimbleann Verdi
(74) *Attorney, Agent, or Firm* — Woodcock Washburn LLP (57) ABSTRACT

Procedures for printing virtualized applications are discussed. In implementations, a spooler is associated with an established virtual environment including a virtualized application. The spooler may be associated by making a native spooler, installed on a computing system aware of the virtual environment. In other implementations, the spooler may be virtualized such as by including an instance of a spooler in the virtual environment. A printer driver may be virtualized for use in print virtual application output. Virtualizing printer drivers may allow virtual applications to access and use printer and/or software resources without installing the resource on the device.

14 Claims, 5 Drawing Sheets

PRINTING FOR VIRTUALIZED APPLICATIONS

BACKGROUND

Installing applications and hardware on individual devices may be problematic, especially in a networked computing environment. For example, when installing a new piece of hardware, such as a printer, each associated computing device may have the appropriate software loaded in order to support the installed printer. In addition, as updates become available, users typically may desire that the individual computing device may be updated with the appropriate software.

Virtualized applications may be delivered on demand to a device and execute within a private container apart from other native or virtual applications. This isolation may prevent conflict and namespace collisions with shared Operating System (OS) resources, extensibility issues, visibility issues, and so on. For instance, instead of accessing a copy of a word processing application residing on the actual device, the device may use a "virtualized" version which runs as if the virtualized application resources were within the desired namespace or environment (i.e., the application runs as if the application were loaded on the computing device).

SUMMARY

Procedures for printing virtualized applications are discussed. In implementations, a spooler is associated with an established virtual environment including a virtualized application. The spooler may be associated by making a native spooler, installed on a computing system aware of the virtual environment. In other implementations, the spooler may be virtualized such as by including an instance of a spooler in the virtual environment. A printer driver may be virtualized for use in printing virtual application output. Virtualizing printer drivers may allow virtual applications to access and use printer and/or software resources without installing the resource on the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described to establish printing for virtual applications. Virtualized printing may permit printing output generated by virtual applications which may not be installed on a computing device running the virtual application. Printing virtualization may reduce the complexity associated with installing and updating printing hardware in networked environments.

In implementations, a virtual environment including an application may be established on a computing system. A spooler may be associated with the virtual environment. For example, the spooler may be made aware of the virtualized environment and/or may be included in the virtual environment, such as by launching another instance of a native spooler within the virtual environment namespace. The native spooler may be made aware by making the OS aware of the virtual environment and thereby notifying the native spooler. In additional implementations, the virtualization environment may mediate the use of the native spooler thus making the virtual application aware of the native spooler. In other instances the sequencer may provide a spooler which is virtualized. A print driver which may include configuration information for an application producing output. In implementations, the print driver may be virtualized such that the print driver is not installed on the device. Thus, the spooler may deliver the application output to a target printer for printing without having to install the print driver on the computing system.

In further implementations, a native spooler which may reside on the device may be made aware of one or more virtual environments including virtualized applications established on the device. The native spooler may access a virtualized print driver for formatting an application output for delivery to a target printer.

Exemplary Environment

Figure 1:
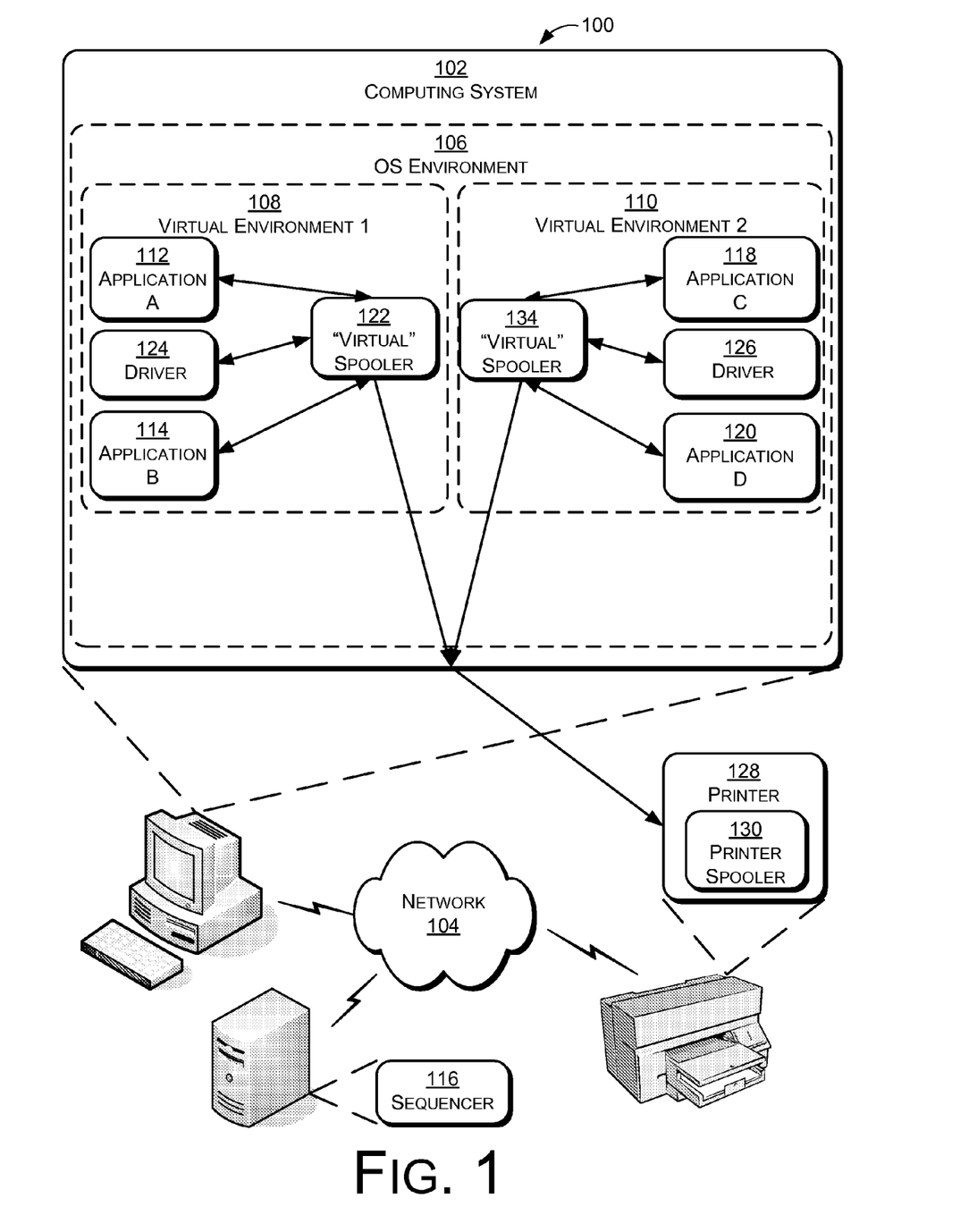
FIG. 1 illustrates an environment in an exemplary implementation that may use technologies to provide virtualized printing for virtual environments.

FIG. 1 illustrates environment 100 in exemplary implementations that are operable to provide virtualized printing for virtual environments. The computing system 102 discussed with respect to the present implementations may be supported by one or more servers and associated hardware for assisting virtualization as desired. For example, the computing system may be included on a network 104 maintained by an organization. While an organization is discussed, the principles discussed herein may be used for a loose conglomeration of associated devices, such as a service which provides virtualized resources for unrelated end users and so on. The network 104 may be a wide area network, a local area network, the Internet or the World Wide Web and so on, as desired. In implementations, the configuration of the computing system and associated servers, hardware and software may be in compliance with an application virtualization scheme/software hardware, such a SOFTGRID (Microsoft Corporation, Redmond Wash.).

In implementations, a computing system 102 may be configured to establish a virtual environment. For example, the virtual environment may be a namespace established, within the operating system (OS) namespace/environment 106, for containing one or more applications. The virtual environment/namespace (such as a first virtual environment 108 and a second virtual environment 110) may isolate the "contained applications/resource" so that the behavior within the virtual environment is not affected by the outside environment. The obverse may apply as well, e.g., the virtual environment may not influence the rest of the OS environment 106. In this general manner, the virtual applications and associated printing tasks may change without having to install or uninstall applications on the individual devices running the application. Virtualized applications and associated virtualized printing may simplify network hardware installation, updates and so on, in comparison to an installed configuration.

For example, a virtual environment may include an Application "A" 112 and an Application "B" 114. The applications may be obtained from appropriate networked hardware. For example, the applications may be obtained from a networked sequencer 116 which transfers the desired application code and/or other data to the computing system 102 or local device on an "as needed basis" or "just in time basis". In implementations, the transferred data may be cached or stored in another manner for use by the local computing device without installing the application on the computing system 102.

The virtual application and various printing "components" (associated with printing virtual applications) may not be set-up on the computing system 102. In this way, applications and associated print functions may operate on a local system without having to set application parameters and extensions on the computing system 102. Virtualization may permit the virtualized application to print without considering factors that may arise if the print components were installed on the device. Complications and inoperability of various hardware/software set-up arrangements may be minimized for virtualized configurations, in comparison to systems in which the application print function components are resident on the computing system 102, as the virtual environment may isolate the applications, print drivers, files and so on from the OS environment 106 or other virtual environments established on the computing system 102.

In embodiments, additional virtual environments may be included on the computing system 102 as well. For example, a second virtual environment 110 may be included for containing other applications and so on. The second virtual environment 110 may isolate the (other) contained application(s), files and so on, from other virtual environments and the OS environment 106. The second virtual environment 110 may include additional applications (such as Applications "C" 118 and "D" 120) which are virtualized in a similar manner to that of the first virtual environment 108. The virtual applications may generate output for printing. For example, if Application A 112 is a word processing application, the output may be a letter for printing on a network or local printer.

In implementations, by virtualizing printing, the computing system 102 may not include a desired driver and/or a spooler within (e.g., installed on the computing device). For example, when establishing a virtual environment, a print spooler may be associated with the virtual environment. While the spooler may be another instance or case of the native spooler (installed on the computing system 102) operating within the virtual namespace (e.g., the virtual environment), in other instances the spooler may be obtained from a networked device. In the former instance, a virtualized spooler 122 is encompassed in the virtual environment and may be aware of the virtual applications within the virtual environment. For example, a virtual spooler 122 (within a virtual environment such as the first virtual environment) may be configured to target local or a networked printer 124 on behalf of the application running in the virtual environment 106. In embodiments, the virtual spooler 122 may be running in the virtual environment 106 prior to the application making the print request, in other implementations the virtualized spooler 122 may launch when "called-on" by the virtual application.

When printing, the spooler may access a print driver 124 for use in formatting the virtual application output. For example, the virtual spooler 122 may access the print driver 124 which the virtual spooler 122 registered for use with the virtual application. For example, the print driver 124 may be a virtualized print driver referenced in a "pseudo" registry for the virtual environment. This is to say, that the OS registry may be unchanged, while the virtual spooler 122 registers a print driver in a registry for the virtual environment so that the print driver 124 may be used when printing output for the virtual application (such as Application A 110). For example, the virtual applications and virtual files may be identified in the registry along with other configuration and setting data. For example, in contrast a "real" environment (in which the applications and drivers are installed on the computing system 102), the virtual print driver 124, such as for a particular application may not be set-up on the individual devices, but rather may be called up from network resources, such as from the sequencer 116 that provides virtual code/data. For example, a print driver may support an application having a print capability with formatting and so on. By preserving virtual environment isolation, conflicts between the virtual print driver 124 and other components in other virtual environments or the OS may be minimized, in comparison to an installed configuration. Correspondingly, print drivers outside the virtual environment (such as a print driver 126 in another virtual environment) may not affect the virtual print driver within the first virtual environment 110. In this manner, a network administrator may distribute the virtual print driver 124 from the sequencer 116 without the configuration issues associated with individual device installations. The sequencer 116 may forward the relevant code/data to the computing system 102 for use in conjunction with the virtual spooler 122. By distributing the virtual print driver 122, information technology support may not have to install the print driver on individual devices or resolve individual (computing) device issues.

The virtual spooler 122 may queue the print tasks (the virtual application output) and access the virtual print driver 124 associated with the application. For example, the virtual print driver 124 may include instructions for formatting the virtual application output for printing such as on printer 128. Once the output is in the desired format for printing, the virtual spooler 122 may transfer the print task to the printer spooler 130 for entering into the print queue. The virtual spooler 122 may contemporaneously transfer the print job as the formatted output becomes available.

In implementations in which virtualized spoolers are included, the virtual spooler may forward the formatted output as if the print task was passed through the device's spooler (e.g., a "native spooler" which may not be "aware" as discussed herein). This is to say that, from the printer spooler perspective, a virtualized print task may be substantially the same as a print task from an installed application. Conflicts between spoolers in various virtual environments on the computing system 102 may be avoided, as spoolers may function as a client which spools the print task on a first-in-first out basis (FIFO), with the printer spooler 130 collecting the inputs (from the printer perspective) and arranging and executing the print tasks. Virtual spoolers and virtual print drivers in other virtual environments (such as a virtual spooler 134 in a second virtual environment 110) may generally perform in a similar manner.

Figure 2:
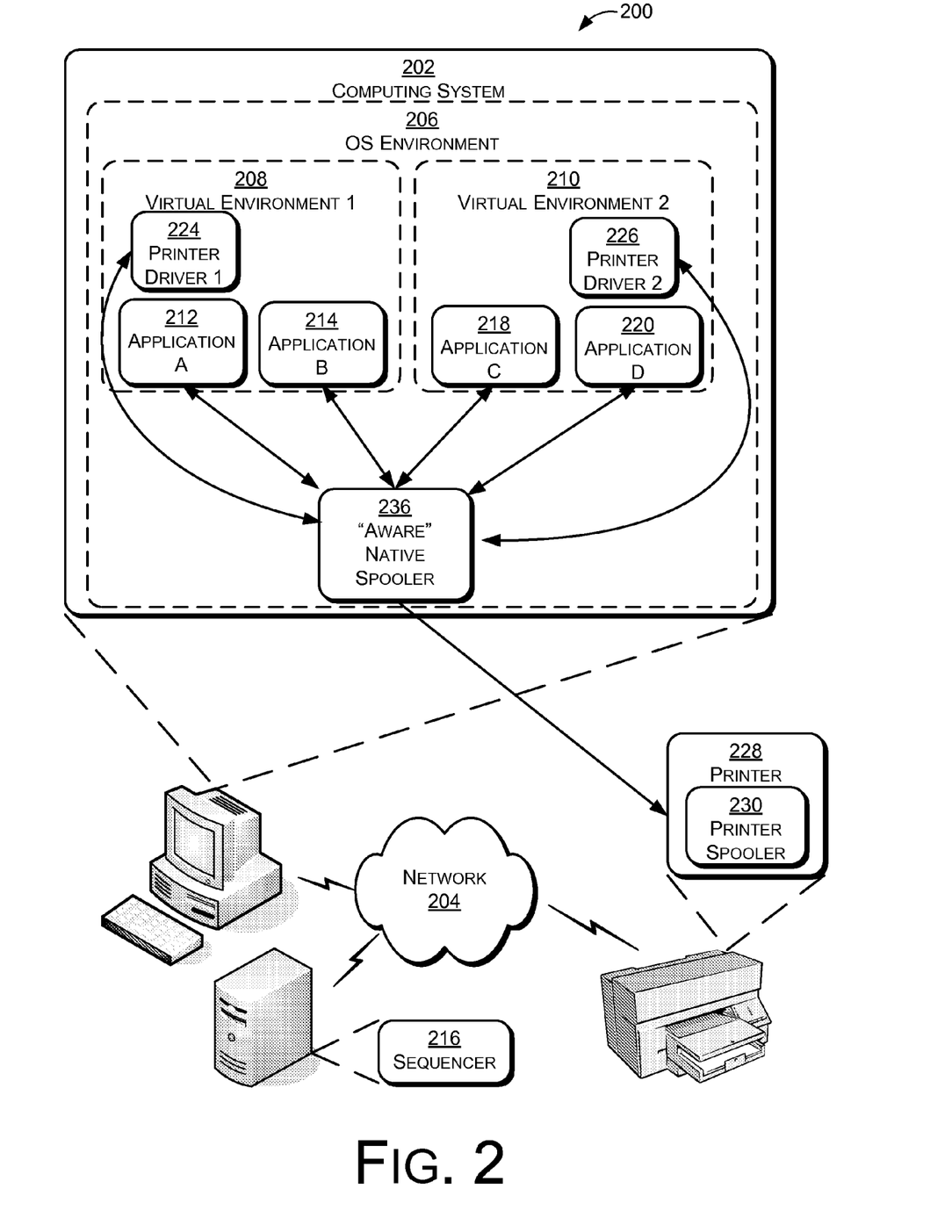
FIG. 2 illustrates an environment in an exemplary implementation that may use technologies to provide virtual application printing.

Referring to FIG. 2, (reference numbering is similarly maintained for similar items, e.g. system 200, Network 204, Sequence 216, Printer 228, and Print Spooler 230, similarly correspond to system 100, Network 104, Sequence 116, Printer 128, and Print Spooler 130 of FIG. 1) in further implementations, an aware native spooler 236 may be used with applications operating in a virtual environment (within an OS environment 206) to provide virtual application printing. For example, for a device running two virtual environments, e.g., virtual environment "1" 208 and virtual environment "2" 210 (including respectively) virtual applications "A" 212 "B" 214 or "C" 218 and "D" 220. The aware native spooler 236 may be made aware of the virtual environment and/or applications. For example, when the virtual environment is created in runtime space, the virtual applications may be pointed to the native spooler 236 that resides on or is installed on the local device. For example, instead of being directed to an instance of the native spooler operating within the virtual environment namespace (as generally discussed above), the applications may be directed to the native spooler 236 which is configured to interact with virtual applications/environments. The aware native spooler 236 may be signaled when the virtual environment is created and when included virtual applications are launched for operation. In this fashion, the native spooler 236 for the computing system 202 may be aware of the virtual applications and/or environments and the virtual applications may be directed to the native spooler 236 installed on the computing system 202. The aware native spooler 236 may forward the print tasks to the printer spooler 230 (i.e., a spooler included in the printer 228 for spooling print tasks obtained from various devices) for entry into the print queue.

In implementations, virtualized print drivers (such as driver 224) may be used in conjunction with the aware native spooler 236. For example, while the virtual applications point to the aware native spooler 236, the native spooler 236 may access a virtualized print driver 224 within the virtual environment (such as environment "1" 208 for the print set-up configuration data, such as for formatting the virtual application output. For example, upon receiving a print output (such as from Application A 212), the aware native spooler 236 may access a virtual print driver 224 to format the output for printing by a targeted printing device (e.g., the printer 228). In this way, the print driver 224 may not be installed on the computing system 202 and conflicts between the print driver (i.e., the virtualized driver 224) and other print driver (such as a print driver 226 in another virtual environment, e.g., virtual environment "2" 210) and related applications are minimized in comparison to a configuration in which the print driver resides on the computing device 202. The virtualized print driver 224 may be provided by a sequencer 216, for use with particular applications as generally discussed with respect to FIG. 1.

In further implementations, the aware native spooler 236 may access print drivers in other virtual environments (such as a second virtual environment 210) on behalf of a virtual application operating in another environment (e.g., a first virtual environment 208). Thus, as the native spooler 236 is made aware of the various environments and print drivers within the virtual environment (namespaces), the native spooler 236 may access these environments without violating the virtual environment's isolation. For example, if a desired print driver is not referenced in a pseudo registry for the virtual environment, the aware native spooler 236 may check if the print driver is available within other virtual environments or installed on the computing system 202 (i.e., within the OS namespace of Operating System Environment 206). If a desired print driver is available, the spooler may implement the print driver for the application even though the driver is not within the virtual environment of the application generating the output.

Generally, any of the functions described herein can be implemented using software, firmware, hardware (e.g., fixed logic circuitry), manual processing, or a combination of these implementations. The terms "module," "functionality," "component" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory.

The following discussion describes techniques that may be implemented using the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Exemplary Procedures

Figure 3:
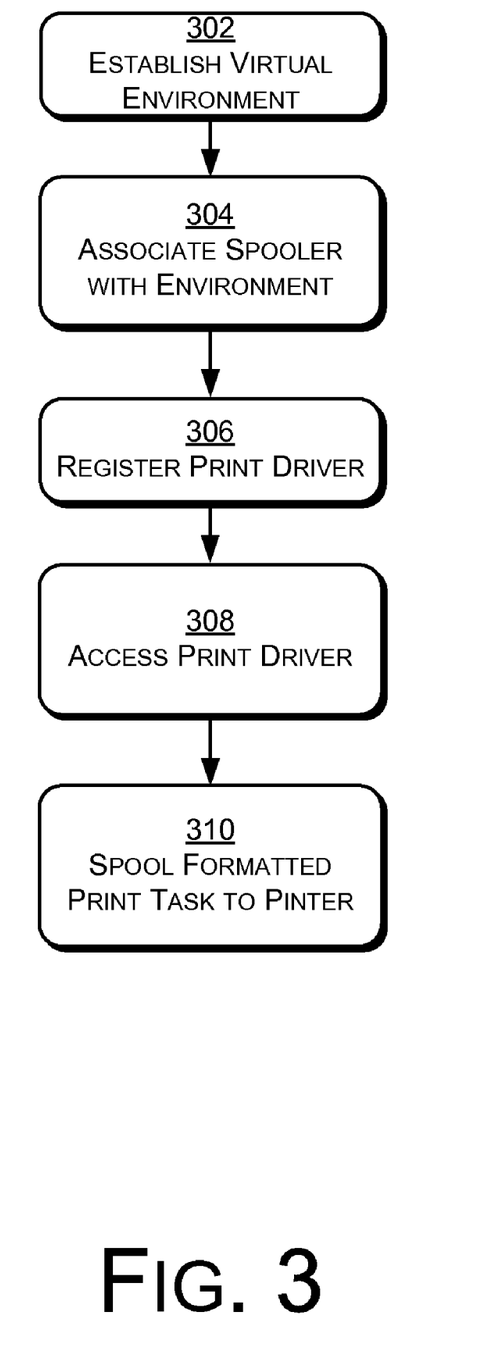
FIG. 3 is a flow diagram depicting a procedure in an exemplary implementation for virtualized printing.

FIG. 3 discusses exemplary procedures for virtual application printing. For example, the techniques discussed herein may be implemented for printing application output for applications not installed on a local computing device. Computing systems operating in accordance with the present techniques may permit printing without the installation and update issues associated with systems in which the print components are retained on the computing system.

In implementations, a virtual environment may be established 302 for a computing system. For example, the virtual environment namespace may be established within the OS namespace. The virtual environment may be configured so that the applications, files and so on, within the virtual environment are isolated from the OS environment and/or other virtual environments. For example, the virtual application code is executed as if the virtual environment were the OS environment. In this way, the configuration of the components within the virtual environment may not be affected by the configuration of other virtual environments or the OS configuration. Correspondingly, the files/applications and so on, in the virtual environment may not affect the environment outside the virtual environment. The code and other data for establishing the virtual environment within the local computing system may be received from a sequencer or other networked resource. A pseudo registry may direct the configuration of the files, applications and the like, within the virtual environment.

A spooler may be associated 304 with the virtual environment. For example, the spooler may be aware of the virtual environment as the spooler may be encompassed within the virtual environment, or the spooler may be the native spooler which is made aware of the virtual environment such as by a notification from a virtual application or the like. In the first example, the virtualized spooler may be a (runtime) instance of the native spooler operating within the virtual environment namespace. In the foregoing manner, the virtualized spooler may spool print requests for virtual application output within the virtual environment namespace. Conflicts may be avoided as the spooler may function as a client, such as by accepting print jobs on a first-in-time or FIFO basis.

In the latter case, the native spooler, which is installed on the computing system running the virtual environment, may be made aware of the existence of the virtual environment namespace based on a virtual application signaling the spooler. For example, if the native spooler is running when the virtual environment is established, a virtual application within the environment may test to determine if the spooler is available. If the spooler (operating in the OS namespace) is launched when the application targets the spooler (e.g., when "called on"), the virtual application receiving a print task may alert the spooler. For example, the virtual application may be configured to target print output through the native spooler installed on the computing system.

When using a virtualized print driver, the spooler may register 306 the print driver in a pseudo registry for the virtual environment. In this manner, the virtual print driver may be accessed for virtual applications within the virtual environment. From an information technology support perspective, using a virtualized print driver may minimize the effort associated with incorporating new printer hardware and providing print driver updates as the virtual environment may have fewer configuration issues in comparison to a computing system OS.

A print driver may be accessed 308 to obtain print configuration data for the application in order to format the output. For example, the spooler may be configured to access a print driver maintained in the virtual environment.

When printing, the spooler may access the print driver so that the printer generates virtual application output as desired. For example, the spooler may spool 310 the formatted output to a printer spooler for printing. Maintaining the print driver in the virtual environment may minimize the affect of other OS settings on the print driver. For example, if an installed application would cause a conflict with an application being installed, the issue may be eliminated if one of the applications was virtualized. The issue may not arise because the virtual environment isolates the virtual application from applications and programs operating within the OS or in other virtual environments.

When using a native spooler (which is aware of the virtual environment and operating outside of the virtual environment), if a desired print driver is not available within the virtual environment, the spooler may access another virtual environment or an installed print driver if available.

Figure 4:
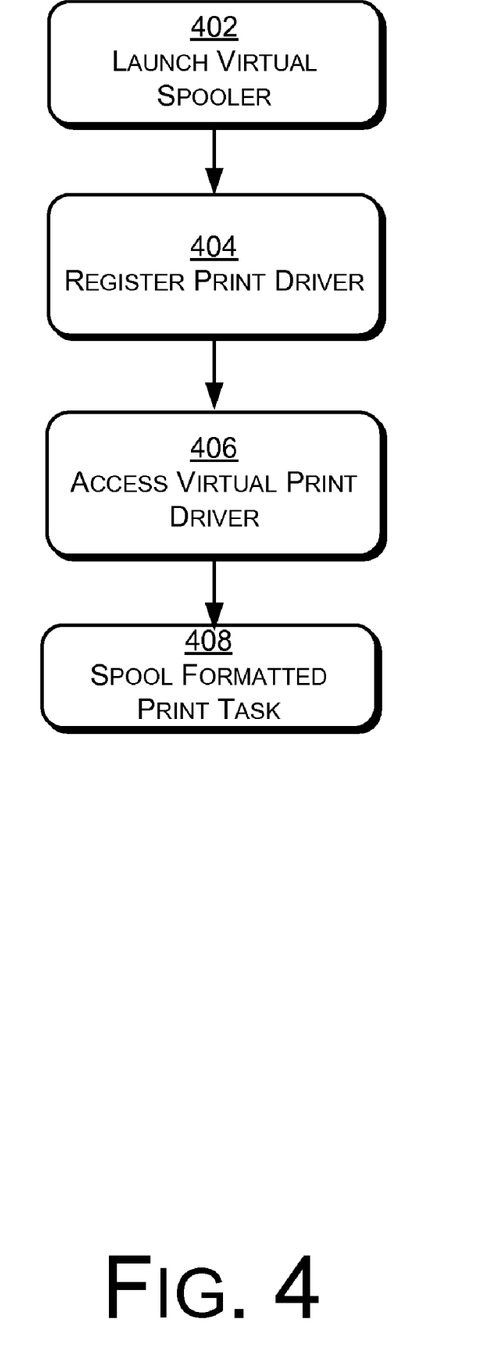
FIG. 4 is a flow diagram depicting a procedure in an exemplary implementation for virtualized printing for virtual environments.

Referring to FIG. 4, implementations for virtualized printing within virtual environments is discussed. A virtual spooler may be launched 402 for use with virtual applications operating within the virtual environment. For example, the virtual spooler may be an instance of the native spooler running in the virtual environment. A virtual spooler may minimize issues associated with installing hardware/software, performing updates and so on, as the print task may be handled without being affected by the OS configuration or other virtual environments as the virtual environment is isolated from the OS environment or other virtual environments. While the virtual spooler may launch when the virtual environment is established, in other instances, the virtual spooler may launch when called on by a virtual application. For instance, the spooler may be initiated upon receiving a virtual application print job.

A virtual print driver may be registered 404 in a pseudo registry for use with the virtual environment and/or virtual applications. In this manner, the virtual environment resister (i.e., the pseudo register) may direct print driver requests to the desired print driver without having to install the print driver into the OS register.

A virtual print driver may be accessed 406 to obtain print instructions. For instance, the virtual spooler may access a print driver registered in a pseudo registry for the virtual environment. The pseudo registry may provide configuration information for the applications, drivers and so on, within the virtual environment, without having to change the OS registry. The virtual spooler may have previously registered the print driver in the pseudo registry. Thus, upon receiving a virtual application print task, the virtualized spooler may access the print driver indicated in the pseudo register so that the application output is spooled 408 to the target printer in the desired format for the application. For example, an application may be output as a XPS (based on eXtensible Markup Language) document or a PDF (portable document format) files.

In implementations, the virtual print driver is not installed on the computing system on which the virtual print driver is operating. Not installing the print driver may permit the print driver to be changed via a sequencer or other network resource and then transferred to the system as desired. Thus, individual (computing) device configuration issues, associated with installing print drivers, may be avoided as the print driver may be isolated within the virtual environment.

For example, instead of running in the OS environment, the virtual spooler and virtual print driver may be isolated so that the spooler and print driver may be configured to run in the virtual environment rather than configuring the spooler and print driver for individual device OS environments. In this manner, support personnel may not have to deal with as many potentially conflicting configurations and settings. Additionally, print drivers, spoolers and/or other printing components may be dynamically distributed.

Figure 5:
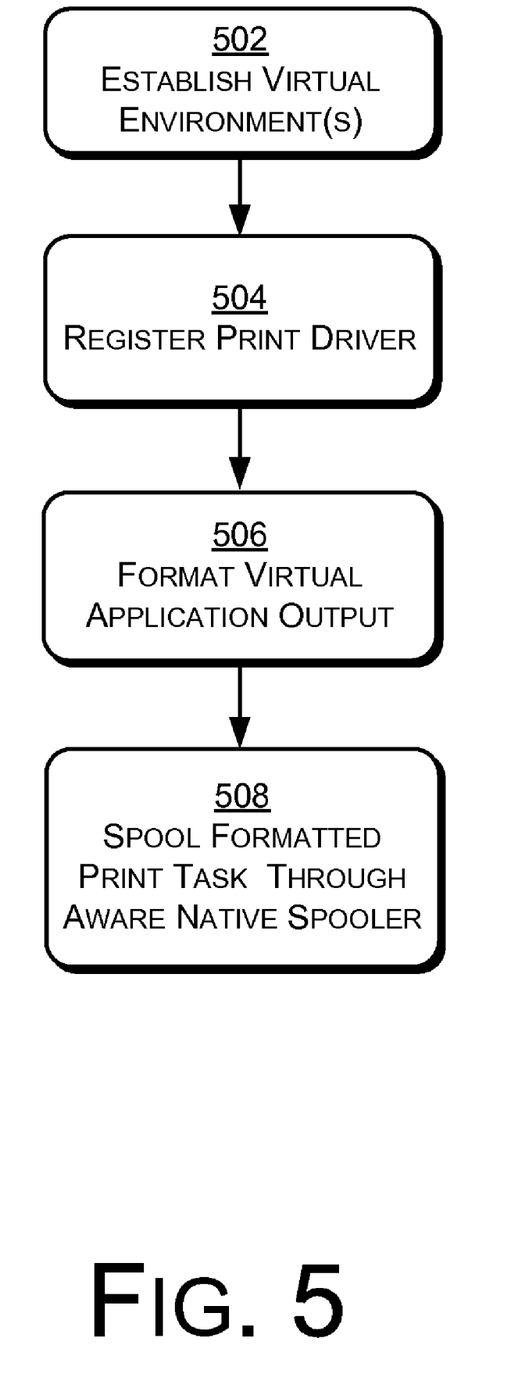
FIG. 5 is a flow diagram depicting a procedure in an exemplary implementation for virtual application printing.

Referring to FIG. 5, in implementations one or more virtual environments are established 502. A virtual environment may include one or more virtual applications and one or more virtual print drivers. For example, if a device operating in accordance with the present techniques produces a virtual application output, such as a task to be printed, the task may be directed to a native spooler for eventual delivery to a target printer.

Multiple print drivers may be included to account for different formats, applications different fonts, languages, or the like. For example, a first application may use a first print driver to format the output in a PDF while a second application may use a different driver to format the output in accordance with an XML specification. The print drivers may be registered 504 in a virtual registry for use with the virtual environment and/or virtual applications within the environment. The print drivers may be configured for use within the virtual environment. For example, the print driver may be used to format 506 the application output in the desired format for the target printer. Thus, while the print driver may conflict with another computing system OS setting if installed on the computing system the print driver may be used because the driver is contained in the virtual environment (namespace).

A native spooler or a spooler which is installed on a computing device configured to operate in conformance with the present techniques may be used to spool 508 the virtual application output. For instance, the native spooler may be aware of the virtual environment and associated virtual programs based on signaling received when establishing the virtual environment.

In other instances, if the spooler is inactive until "called on" a virtual application print task may inform the spooler of the existence of the virtual application/environment. In the above situations, the spooler may access the desired print driver so that the output is formatted for the targeted printer and the output spooled to a printer spooler which inserts the formatted print task into the printer queue. If a desired print driver is contained within the virtual environment including the application, the native spooler may obtain a suitable print driver from another virtual environment or from the OS environment if available. For example, a virtual print driver in a second virtual environment may be used for formatting a print output for a virtual application in a first virtual environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. A method comprising:
  establishing a first virtual environment on a computing device including a first virtualized application generating output, the first virtual environment comprising a first print driver;
  establishing a second virtual environment on the computing device including a second virtualized application generating output, the second virtual environment comprising a second print driver;
  associating a spooler with the first virtual environment such that the spooler is aware of the first virtual environment;
  associating the spooler with the second virtual environment such that the spooler is aware of the second virtual environment;
  the spooler accessing the first print driver, the first print driver being configured for use with the first virtualized application output; and
  the spooler accessing the second print driver, the second print driver being configured for use with the second virtualized application output.

2. The method as described in claim 1, wherein the spooler is a native spooler for the computing device.

3. The method as described in claim 1, wherein the first or second print driver is virtualized.

4. The method as described in claim 1, wherein the first or second virtual environment is configured not to be installed on a physical device executing the first or second virtualized application.

5. The method as described in claim 1, wherein the spooler is isolated within an operating system environment.

6. The method as described in claim 1, wherein the first or second print driver is not installed on the computing device containing the first or second virtual environment.

7. A computer-readable memory device comprising computer-executable instructions that, when executed, direct a computing system to at least:
  launch a spooler, for use with a first virtualized application generating output in a first virtual environment and a second virtualized application generating output in a second virtual environment, the first virtual environment having a first print driver and the second virtual environment having a second print driver;
  associating the spooler with the first virtual environment such that the spooler is aware of the first virtual environment;
  associating the spooler with the second virtual environment such that the spooler is aware of the second virtual environment;
  the spooler accessing the first print driver for use with the first virtualized application output; and
  the spooler accessing the second print driver for use with the second virtualized application output.

8. The computer-readable memory device as described in claim 7, wherein the first or second print driver is included in the first or second virtual environment.

9. The computer-readable memory device as described in claim 7, wherein the spooler is configured to register the first or second print driver in a registry which is separate from a system registry.

10. The computer-readable memory device as described in claim 7, wherein the spooler is isolated within an operating system environment.

11. A computer-readable memory device comprising computer-executable instructions that, when executed, direct a computing system to:
  establish a plurality of virtual environments on a computing device, each of the plurality of virtual environments including a virtual application for producing output and a virtual print driver configured to format the output; and
  access the output for each of the virtual applications formatted by each of the virtual print drivers by a native spooler for the computing system, the native spooler aware of each of the plurality of virtual environments;
  the native spooler accessing each of the virtual print drivers for each of the plurality of virtual environments for use with each of the virtual application outputs.

12. The computer-readable memory device as described in claim 11, wherein the native spooler is installed on the computing system.

13. The computer-readable memory device as described in claim 11, further comprising register the virtual print driver in a pseudo registry.

14. The computer-readable memory device as described in claim 13, wherein the native spooler is configured to access a first virtual print driver in a first virtual environment, included in the plurality of virtual environments, on behalf of a second virtual application included in a second virtual environment included in the plurality of virtual environments.

* * * * *